United States Patent [19]

Eden et al.

[11] Patent Number: 4,736,381
[45] Date of Patent: Apr. 5, 1988

[54] OPTICALLY PUMPED DIVALENT METAL HALIDE LASERS

[75] Inventors: J. G. Eden, Mahomet, Ill.; Dennis P. Greene, Los Alamos; Kevin P. Killeen, Sandia Park, both of N. Mex.

[73] Assignee: Board of Trustees, University of Illinois, Urbana, Ill.

[21] Appl. No.: 829,690

[22] Filed: Feb. 14, 1986

[51] Int. Cl.⁴ ............................................. H01S 3/223
[52] U.S. Cl. ......................................... 372/56; 372/70
[58] Field of Search ........................ 372/56, 70, 58, 91

[56] References Cited

U.S. PATENT DOCUMENTS

| | | | |
|---|---|---|---|
| 4,168,475 | 9/1979 | Schimitschek et al. | 372/56 |
| 4,228,408 | 10/1980 | Schimitschek et al. | 372/56 |
| 4,229,711 | 10/1980 | Schimtschek et al. | 372/56 |
| 4,262,267 | 4/1981 | Schimitschek et al. | 372/60 |
| 4,607,371 | 8/1986 | Eden et al. | 372/56 |

Primary Examiner—James W. Davie
Assistant Examiner—B. Randolph
Attorney, Agent, or Firm—Philip Hill

[57] ABSTRACT

Laser systems, exhibiting energy conversion efficiencies greater than 20%, employ divalent metal halides, dissociated either electrically or optically, and pumped optically, usually by means of an arc lamp or an incoherent flashlamp. Either pulsed and continuous-wave lasing can be effected in or near the visible region.

20 Claims, 2 Drawing Sheets

FIG. I

OPTICALLY PUMPED DIVALENT METAL HALIDE LASERS

This invention was made with Government support under contract DAAG 29-83-K-0108, awarded by the Army Research Office, and under contract ECS 83-09641, awarded by the National Science Foundation. The Government has certain rights in this invention.

BACKGROUND OR THE INVENTION

Lasers based on excitation by photodissociation were first reported in 1964 and employed lasing in iodine by dissociating an alkyl iodide. Later reports involved excitation in the infrared region of the spectrum involving bromine or an alkali metal. More recently laser action has been generated by photodissociation of mercuric bromide ($HgBr_2$) in the vapor phase when pumping with an ArF excimer laser, generating 193 nm wavelength output. The produced laser action exhibited a wavelength of 502 nm. As discussed by Schimitschek and co-workers, in U.S. Pat. Nos., 4,168,475; 4,228,408; and 4,229,711, the overall efficiency of such systems is very low, being generally about 1–3%.

The aforementioned patents generally relate to pumping dissociated mercuric halides. These molecules lase in interesting spectral regions by recombination of radicals with emission of radiation energy (HgCl:yellow-green at 557 nm; HgBr:blue-green at 502 nm; and HgI:violet at 440 nm) but their development has been very slow. Most of the work to date has involved the radical HgBr because of government interest in possible use for undersea communication systems.

If one wishes to pump such lasers optically, it has been necessary to use an optical source that emits photons having a wavelength of about 200 nm. This has generally meant the use of an ArF laser (193 nm) but the overall efficiency is limited to that of the ArF laser. Such laser photons are very expensive and, accordingly, such pumping means are not commercially attractive. Electrically pumped lasers of this type have been limited to short pulse lengths, typically less than 1 microsecond. It is very difficult to sustain a uniform "glow" discharge for more than several hundred nanoseconds. In such systems the $HgX_2$ (X=I, Br or Cl) molecule must reform in each cycle and this is a slow process. Furthermore, depletion of the $HgX_2$ "fuel" also limits laser pulse lengths. These features as well have limited commercial development.

An improved mercury bromide laser, lasing in the visible blue-green spectrum would be of great interest in essentially revolutionizing military satellite-to-submarine communication. Improved metal halide lasers generally would be of interest for other purposes, such as medical applications, as well. Thus, there is an intriguing need for the development of such lasers having commercially attractive energy efficiencies in both pulsed and continuous-wave systems.

SUMMARY OF THE INVENTION

This invention relates to optically pumped metal halide fragments of divalent metal halides vaporizable within the temperature range from about 50° to about 550° C. to provide vapor pressures generally within the range from about 1 to about 10 Torr. Dissociation may be effected by either electric or optical means. Pumping may be effected by either a laser system, preferably emitting in the near ultraviolet region of the spectrum, or an incoherent flashlamp, preferably emitting energy having a wavelength in the range from about 325 to about 400 nm.

Continuous-wave, as well as pulsed, lasing may be achieved, for example, by use of a continuous discharge for dissociation and an arc lamp for pumping.

Energy conversion efficiency of up to 22% (photon conversion efficiency of 32%) has been achieved while pumping in the ultraviolet region and lasing, for example with mercury bromide, in the blue-green visible region of the spectrum.

It is, therefore, an object of this invention to provide either pulsed or continuous-wave laser systems having such improved energy efficiencies as to suggest attractive commercial utility. The requisites of the systems of this invention include sources for heat, to vaporize the molecular divalent metal halide, and for dissociation energy, to provide diatomic metal halide fragments, as well as an optical pumping means for achieving the requisite vibrational energy levels. A further requirement is an aligned optical cavity.

It is a further object of this invention to effect more efficient lasing, employing diatomic metal halide fragments, in a system wherein the diatomic metal halide fragments are cycled between ground state and low-lying electronic excited states with little or no recombination into molecular divalent metal halide.

Preferred molecular divalent metal halides include the mercury halides.

DESCRIPTION OF THE INVENTION

Figure 1:
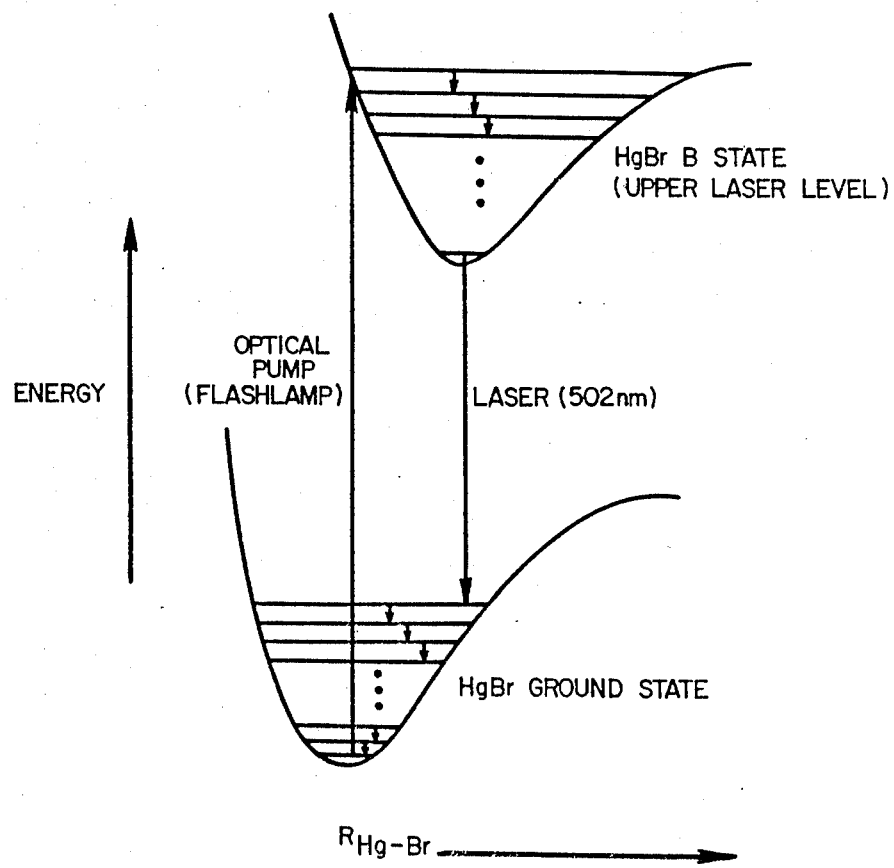
FIG. 1 presents a partial energy level diagram for a typical diatomic metal halide fragment employed in the system of this invention.

The system of this invention is based upon the novel observation of successful pumping of diatomic metal halide fragments, or radicals, without a return to the molecular metal dihalide state. Means have been found for successful cycling of such radicals between a ground energy state and various vibrational energy levels of a low-lying electronic excited state by pumping with either laser means or with generally available inexpensive optical means such as a flashlamp or an arc lamp.

The laser system of this invention is capable of emitting energy in or near the visible region of the spectrum, generally in response to pumping in the ultraviolet region. The system generally comprises:

(a) enclosure means;

(b) a molecular divalent metal halide and an inert buffer gas, present within said enclosure means;

(c) a heat source, for vaporization of said molecular divalent metal halide, capable of maintaining said enclosure means at a temperature within the range from about 50° to about 550° C.;

(d) a source of dissociative energy, located in proximity to said enclosure means and in communication therewith, for effecting dissociation of said vaporized molecular divalent metal halide into diatomic metal halide fragments thereof present in a ground electronic energy state;

(e) optical pumping means, located in proximity to said enclosure means and in communication therewith; whereby the diatomic metal halide fragments are raised from the ground electron energy state to one or more vibrational energy levels of a low-lying electronic excited state; and (f) an optical cavity, disposed about said enclosure means, aligned to obtain lasing from optical transitions in which the diatomic metal halide fragments return to their ground electronic energy state.

For pulsed systems, ground state dissociated fragments are optically pumped to high vibrational levels with an ultraviolet laser or, preferably, an incoherent source such as a flashlamp. Lasing occurs as the fragments thereafter fall to the ground state. Advantages for these systems include:

(1) Optical pumping of the laser requires wavelengths near 350 nm which can be readily and efficiently generated by any of a number of inexpensive incoherent sources.

(2) Fuel depletion is not a problem because the dissociated fragment is the only species required for operation of the system. The radical is immediately available for re-excitation.

(3) Quantum efficiency is high, being about 70%.

(4) The absorption band of the dissociated fragment is so broad that a large fraction of the flashlamp radiation is useful.

(5) Pump radiation is absorbed over a broad spectral range by a large number of vibrational states and funneled into one or two radiating levels, so that laser emission occurs from vibrational levels that are not pumped.

(6) Quasi-continuous-wave systems are possible because the optical pulse lengths generated by this system are not intrinsically limited by any chemical reaction.

For a conventional continuous-wave system, the optical pumping means is preferably an arc lamp.

In a preferred embodiment of this invention, a sealed enclosure means is employed and is maintained within a double elliptical optical cavity.

Molecular divalent metal halides include the various dihalides of mercury, lead, tin, germanium, and iron, all being vaporizable within the prescribed temperature range (50°–550° C.), readily achievable by a suitable heat source such as an oven, and within the prescribed pressure range (0.1–5 atm.) to provide a partial vapor pressure generally within the range from about 1 to about 10 Torr, and preferably about 1 Torr. In some instances the heat evolved from the flashlamp may be sufficient to provide the required heat duty. A preferred incoherent flash lamp is a xenon flashlamp, emitting at about 350 nm wavelength.

Of the various metal halides, the mercury dihalides (in their various isotopic forms) are preferred, including the chloride, bromide, and iodide. Additionally the alkyl mercury halides, such as methyl mercury bromide, may be employed.

In addition to the metal halide, the enclosure means must contain an inert buffer gas atmosphere for the purpose of relaxing the upper laser level's vibrational manifold. Suitable buffer gases include helium, neon, argon, krypton, xenon, radon, nitrogen, hydrogen, and mixtures of these. Suitable system pressures may vary from about 0.1 to about 5 atmospheres.

Dissociation of the selected metal compound may be achieved electrically, as with either a pulsed or continuous discharge, or optically, as with an external laser.

The optical pumping means, in the various embodiments of this invention, may vary from a laser system to an arc lamp to an incoherent flashlamp, all characterized by emitting within the near ultraviolet region of the spectrum. When using a flashlamp or example, it is preferred that it emit energy at a wavelength in the range from about 325 to about 400 nanometers.

In various embodiments of this invention, both dissociation and pumping may be effected with the same energy source, as, for example, an incoherent flashlamp or an arc lamp.

FIG. 1 presents a partial energy level diagram for embodiments employing the mercuric bromide radical, HgBr, in which energy level is plotted against the degree of separation of Hg and Br in the HgBr radical. The HgBr radical is pumped optically, conveniently with a flashlamp, to an upper laser level or B state. These states then relax by collisions with the background, or buffer, gas and populate the lower vibrational levels of the B state. Lasing then occurs as the radical falls to the ground state from these vibrational levels that were never pumped.

There remains the possible adjustment of EV (electron-volt) output to obtain effective electrical pumping in a commercially attractive manner.

The following examples are illustrative, without limitation, of the laser systems of this invention.

EXAMPLE I

Figure 2:
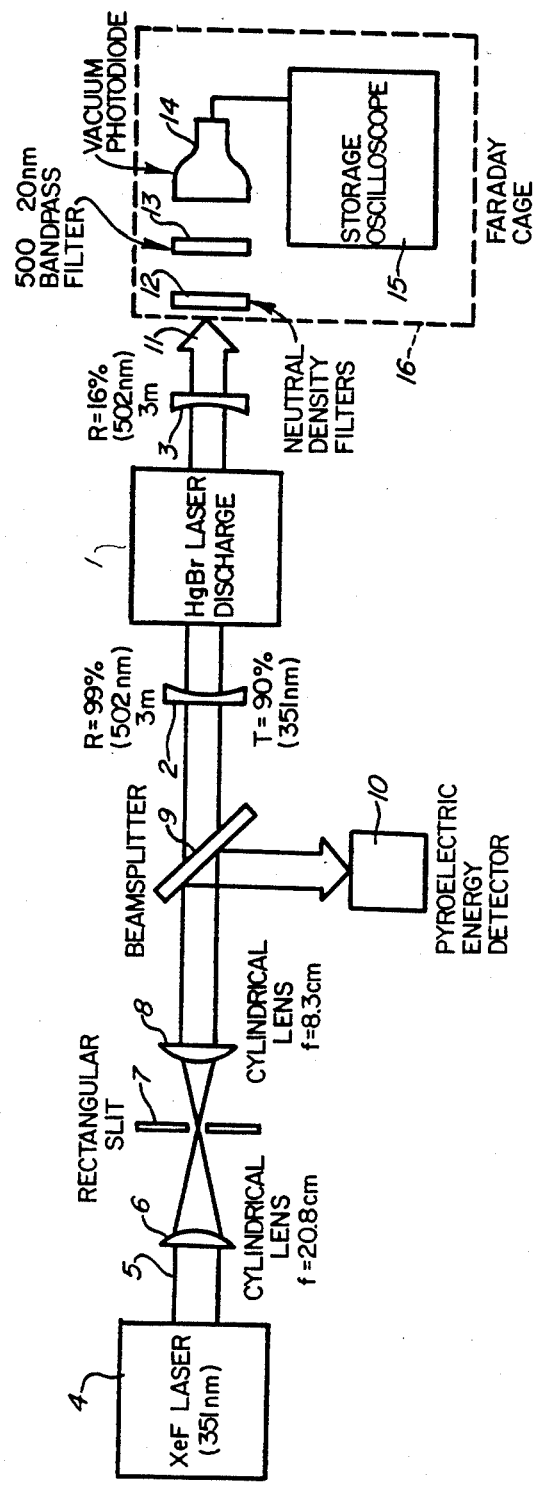
FIG. 2 presents a schematic diagram of one embodiment of the use of the apparatus employed in this invention.

With reference to FIG. 2, mercuric bromide was dissociated in discharge cell 1, having an excitation length of 50 cm, charged with several milligrams of $HgBr_2$. The cell was heated in an oven, not shown, to 420° K. (147° C.) so that the $HgBr_2$ density was $4.1 \times 10^{16}$ molecules/cm$^3$. The densities of the gases in the nitrogen-neon buffer gas were $3.2 \times 10^{18}$/cm$^3$ for nitrogen and $3.8 \times 10^{19}$/cm$^3$ for neon. The charging voltage was nominally 30 kV and the instantaneous power loading of the discharge was 1–2 MW/cm$^3$.

An optical cavity, including mirrors 2 and 3, was placed around the discharge cell 1. Each mirror was spherical, having a 3 m radius of curvature. Mirror 2 was selected to transmit 90% of the ultraviolet (351 nm) radiation, permitting entry of the external laser pulse to the discharge cell.

Xenon fluoride laser source 4 emitted beam 5 which was passed through lens telescope 6 where the beam was compressed to match the discharge area. After passing through slit 7, lens 8, and beam splitter 9, the laser power was monitored by pyroelectric detector 10. The HgBr laser output beam 11 was passed through mirror 3, neutral filter 12 and bandpass filter 13 for recording by vacuum photodiode 14 and oscilloscope 15, the latter items being contained within Faraday cage 16.

The $HgBr_2/N_2/Ne$ discharge was fired conventionally to form HgBr radicals. The XeF laser pulse was timed to arrive thereafter to pump the HgBr radicals from the ground state to the B state (upper laser level) before they could recombine with Br atoms. Lasing occurred due to the XeF laser pumping with 22% energy conversion efficiency and 32% photon conversion efficiency.

EXAMPLE II

The procedure of Example I was repeated, replacing the XeF laser with a neodymium-YAG (Nd-YAG) laser, frequency-tripled to emit at 355 nm. Lasing of HgBr radicals occurred in the same manner as before.

EXAMPLE III

A small amount (<1 mg.) of mercuric bromide and argon buffer gas (760 Torr at S.T.P.) were placed in an optical cell, 7 mm o.d.×25 cm, made of Suprasil (TM) quartz tubing. Quartz windows were sealed onto each end of the tube at Brewster's angle with quartz frit.

The filled tube was placed inside a coaxial flashlamp having 1 cm i.d. The lamp was driven by a low-inductance capacitor/spark gap system. The capacitor was normally charged to 20 kV.

Two 99% reflectors (3 m radius of curvature) defined the optical cavity. The laser pulse length was 250 nanoseconds, some tenfold the duration of the HgBr B state radiative lifetime, so that this laser could be characterized as quasi-continuous wave (CW).

The threshold output power occurred at about 140° C. (corresponding to about 1 Torr $HgBr_2$) and rose linearly with temperature as far as measurements were carried (160° C.; 4 Torr $HgBr_2$).

We claim:

1. A laser system, emitting energy in or near the visible region of the spectrum, comprising:
   (a) enclosure means;
   (b) a molecular divalent metal halide and an inert buffer gas, present within said enclosure means;
   (c) a heat source, for vaporization of said molecular divalent metal halide, capable of maintaining said enclosure means at a temperature within the range from about 50° to about 550° C.;
   (d) a source of dissociative energy, located in proximity to said enclosure means and in communication therewith, for effecting dissociation of said vaporized molecular divalent metal halide into diatomic metal halide fragments thereof present in a ground electronic energy state;
   (e) optical pumping means, located in proximity to said enclosure means and in communication therewith; whereby the diatomic metal halide fragments are raised from the ground electron energy state to one or more vibrational energy levels of a low-lying electronic excited state; and
   (f) an optical cavity, disposed about said enclosure means, aligned to obtain lasing from optical transitions in which the diatomic metal halide fragments return to their ground electronic energy state.

2. The laser system of claim 1, having a sealed enclosure means.

3. The laser system of claim 1 wherein the molecular divalent metal halide is selected from the class consisting of the dihalides of mercury, lead, tin, germanium, and iron.

4. The laser system of claim 1 wherein the molecular divalent metal halide is selected from among the various isotopes of mercury chloride, mercury bromide, and mercury iodide.

5. The laser system of claim 4 wherein the molecular divalent mercury halide is mercury chloride.

6. The laser system of claim 4 wherein the molecular divalent mercury halide is mercury bromide.

7. The laser system of claim 4 wherein the molecular divalent mercury halide is mercury iodide.

8. The laser system of claim 1 wherein the molecular divalent metal halide is an alkyl mercury halide.

9. The laser system of claim 8 wherein the alkyl mercury halide is methyl mercury bromide.

10. The laser system of claim 1 wherein the inert buffer gas is selected from the class consisting of helium, neon, argon, krypton, xenon, radon, nitrogen, hydrogen, and mixtures thereof.

11. The laser system of claim 1 wherein the source of dissociative energy comprises electrons from a pulsed discharge.

12. The laser system of claim 1 wherein the source of dissociative energy comprises electrons from a continuous discharge.

13. The laser system of claim 1 wherein the source of dissociative energy comprises photons from an external laser.

14. The laser system of claim 1 wherein the optical pumping means comprises a laser system emitting in the near ultraviolet region of the spectrum.

15. The laser system of claim 1, operating as a pulsed laser system, wherein the optical pumping means comprises an incoherent flashlamp.

16. The laser system of claim 15 wherein both the source of dissociative energy and the optical pumping means comprise an incoherent flashlamp.

17. The laser system of claim 16 wherein the flashlamp emits energy having a wavelength within the range from about 325 to about 400 nanometers.

18. The laser system of claim 1, operating as a continuous-wave laser system, wherein the optical pumping means comprises an arc lamp.

19. The laser system of claim 1 wherein the optical cavity is a double elliptical cavity.

20. The laser system of claim 1 wherein the total pressure maintained within the enclosure means is within the range from about 0.1 to about 5 atmospheres.

* * * * *